C. WIEBKE.
CYCLOIDAL MILLING MACHINE.
APPLICATION FILED DEC. 3, 1908.

935,345.

Patented Sept. 28, 1909.
4 SHEETS—SHEET 3.

Witnesses:
Victor D. Borst
Wm. Ashley Kelly

Inventor:
Charles Wiebke
by Henry D. Williams
Attorney.

C. WIEBKE.
CYCLOIDAL MILLING MACHINE.
APPLICATION FILED DEC. 3, 1908.

935,345.

Patented Sept. 28, 1909.
4 SHEETS—SHEET 4.

Witnesses:
Victor D Borst
Wm. Ashley Kelly

Inventor:
Charles Wiebke
by Henry D. Williams
Attorney.

UNITED STATES PATENT OFFICE.

CHARLES WIEBKE, OF NEWARK, NEW JERSEY.

CYCLOIDAL MILLING-MACHINE.

935,345.  Specification of Letters Patent.  Patented Sept. 28, 1909.

Application filed December 3, 1908. Serial No. 465,838.

*To all whom it may concern:*

Be it known that I, CHARLES WIEBKE, a citizen of the United States, residing at Newark, in the county of Essex and State of New Jersey, have invented a certain new and useful Improvement in Cycloidal Milling-Machines, of which the following is a specification, reference being had therein to the accompanying drawings, forming part thereof.

My invention relates to milling machines and particularly to machines for milling or cutting on cylindrical surfaces to produce embossing or fluting rollers for embossing figures or designs.

Broadly, my invention comprises means whereby figures may be cut on cylindrical work by developing or presenting a cylindrical surface of the work at all times substantially in the plane of a revolving cutting tool. By these means a design may be cut with facility upon a cylindrical surface, with an assurance that the exact design cut upon the cylindrical surface will be reproduced upon the embossed surface, in the operation of the embossing or fluting rollers thus cut. Heretofore it has been customary to engrave such figures by hand, a process entailing great time and expense. According to my invention the cylindrical work is given a compound movement equivalent to rolling it along its pitch face substantially in the plane of rotation of the cutting tool. In this movement each point of the cylindrical work describes a cycloidal curve and the cylindrical work is developed before the cutting tool.

An object of my invention is to provide means for accomplishing the foregoing result in a simple and thoroughly effective manner.

Another object is to provide means for determining the degree of rotative adjustment of the work.

Other objects and advantages of my invention will appear from the following description.

I shall now describe my invention with reference to the accompanying drawings and shall thereafter point out my invention in claims.

Figure 1:
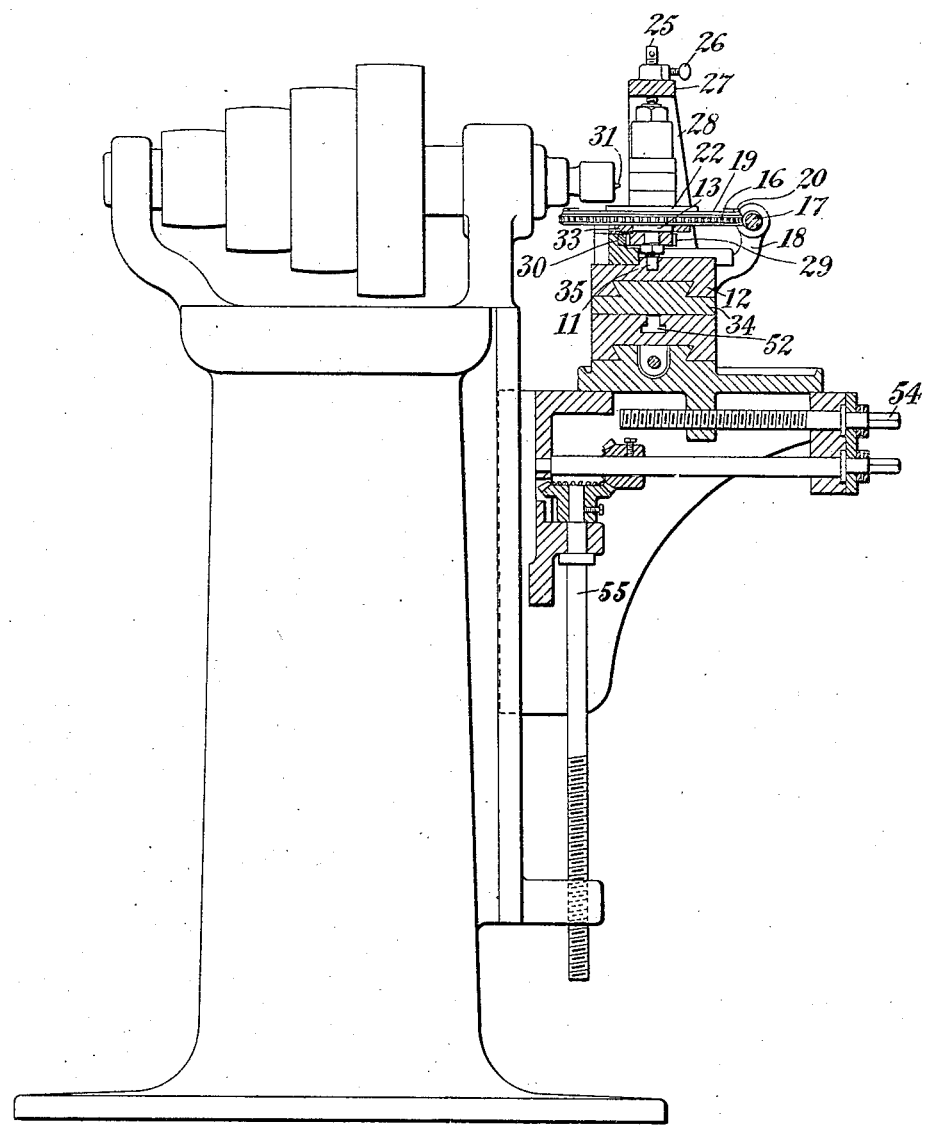
Figure 2:
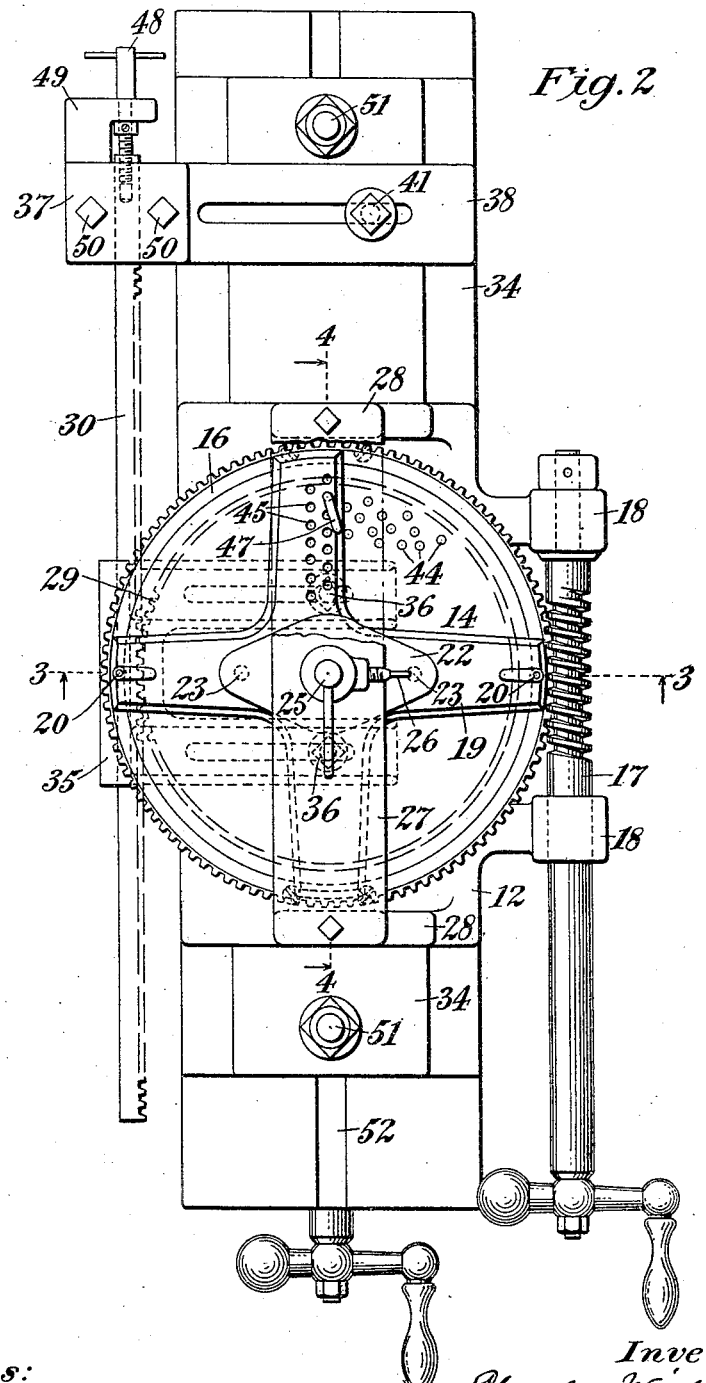
Figure 3:
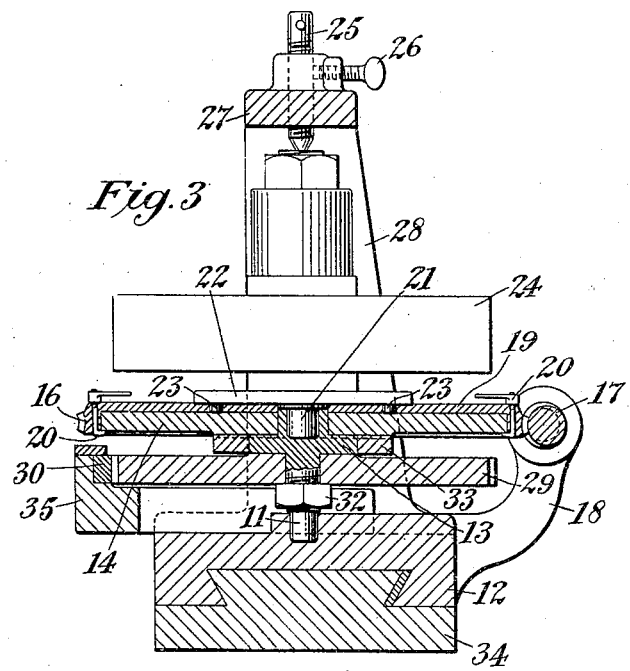
Figure 4:
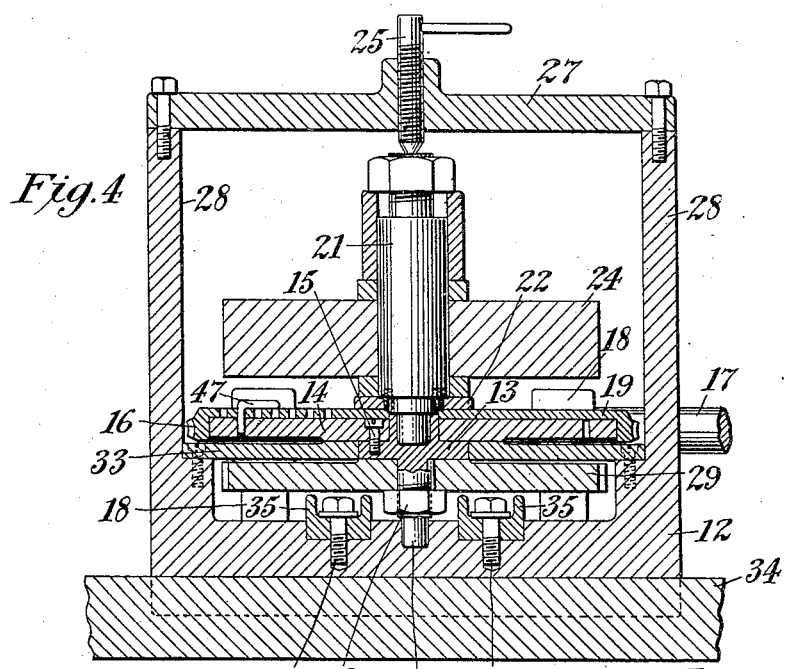
Figure 5:
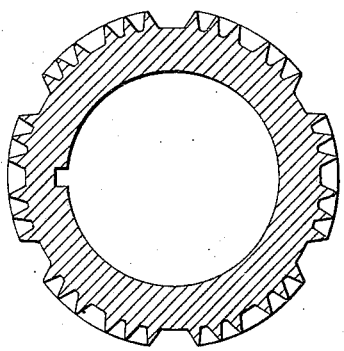
Figure 9:
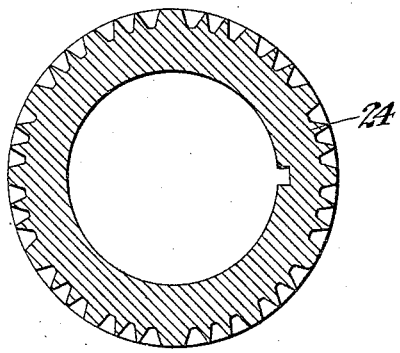
Figure 6:
Figure 10:
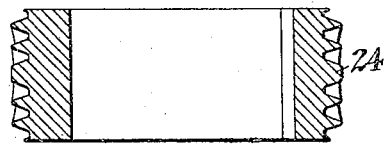
Figure 7:
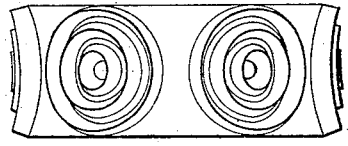
Figure 11:
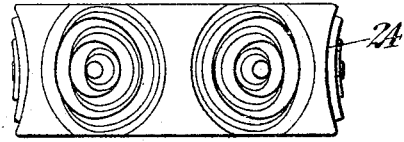
Figure 8:
Figure 12:
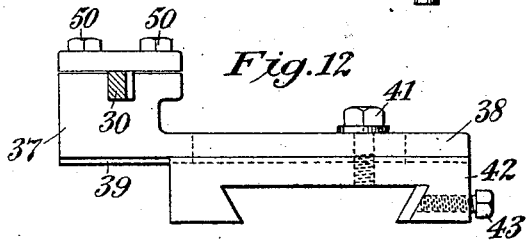
Figure 13:
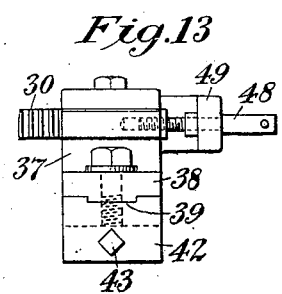

Figure 1 is an elevation partly in section showing my device in connection with a milling machine. Fig. 2 is a plan view of my device on a larger scale than Fig. 1 with the work removed. Fig. 3 is a vertical section of my device on a plane indicated by the line 3—3 of Fig. 2. Fig. 4 is a similar section taken on the line 4—4 of Fig. 2. Figs. 5, 6 and 7 are views of a female roller cut on my machine. Fig. 5 is a central horizontal section, Fig. 6 is a central vertical section, and Fig. 7 is an elevation. Fig. 8 is an enlarged detail of an indexing plug. Figs. 9, 10 and 11 are views similar to Figs. 5, 6 and 7, showing the male rollers cut by my machine. Fig. 12 is a detail of the rack support in side elevation with the rack in section. Fig. 13 is a detail end elevation of the same.

In the embodiment of my invention shown in the drawings, I employ an arbor or stud 11 journaled in the center of the base of the work carriage 12, the arbor 11 having near its upper end a collar 13 integral therewith. Mounted on the arbor 11 and bearing on the collar 13 and concentric therewith is the cylindrical table or indexing plate 14 attached to the collar 13, as by the screws 15, so as to be rotated with the arbor 11. Encircling the index plate 14 is a worm wheel 16 meshing with and rotated by the worm 17, the bearings of which are the arms 18 extending upward from the base 12. The spokes of the worm wheel 16 comprise the four arms 19, which are cast integral with the worm wheel and are mounted on the arbor 11 and rest on the plate 14, and the arms or spokes extend past the periphery of the plate 14 and support the worm wheel 16 in position; and clamping bolts 20, extending through the ends of two of the arms and through the worm wheel, have claws extending under the plate 14 and are adapted, when clamped, to lock together the plate 14 and the worm wheel 16. In the top of the arbor 11 is journaled the work-holding spindle 21, and a carrier 22 is secured thereto and rests on the arms 19 when the spindle is in its bearing in the arbor 11. The carrier 22 is provided with pins 23 adapted to fit into holes in the arms 19, thus securing the parts together so that the work is rotated with the plate 14 and worm wheel 16 by the worm 17. The work 24 is clamped on the spindle 21 by clamping rings and a nut, as shown, and the screw 25, locked in place by the set-screw 26, serves as the top bearing for the spindle.

The screw 25 has its bearing in the crosspiece 27, which is supported on the upright arms 28 of the carriage 12.

It is necessary for the successful operation of my device that, as the work is rotated by the worm 17, as above described, it shall be carried along as though rolled on its pitch surface before the tool, that is, it must be bodily moved a distance substantially equal to the length of the arc of movement of a point in the periphery of its pitch circle. For this purpose a gear wheel 29, of a pitch circle corresponding to the pitch circle of the work, is mounted on the arbor 11 to rotate therewith, being keyed thereto as shown, and coöperates with a rack 30. A nut 32 on the arbor 11 serves to clamp the gear wheel 29 up against the collar 13 of the arbor. A strengthening plate 33 bridging across the carriage, as shown, provides a bearing for the collar 13 to steady the rotating parts. The carriage 12 is provided with a dovetail groove extending parallel to the rack, and the supporting base 34 has a corresponding tongue fitting therein, thus furnishing a guide whereby the carriage may slide back and forth before the cutting tool 31. It is now evident that as the worm 17 is turned, with the bolts 20 clamped, all of the parts mounted on the spindle 21 and the arbor 11, viz., the work 24, the worm wheel 16, the plate 14 and the gear wheel 29, will be rotated. At the same time, due to the coöperation of the gear wheel 29 and the rack 30, the carriage 12 and all the parts carried by it slide along on the base 34, with the result that the work is properly presented to the cutting tool.

I provide an adjustable support for the rack, separately shown in Figs. 12 and 13, and comprising a capped standard 37, in which the rack is clamped by set-screws 50 and which has an arm 38 extending over the base 34 and supported by a separate carriage 42 having a dovetail groove fitting over the tongue on the base 34, and provided with a set-screw 43 for locking it in desired position on the base. The arm 38 of the rack support has a small rectangular tongue fitting in a guide-groove at the top of the rack-carriage 42 and has a long slot through which passes a bolt 41 tapped into the rack-carriage and operating to clamp the rack-support in desired position upon the rack-carriage. A further and delicate adjustment of the rack in a longitudinal direction is provided by the screw 48 threaded into the end of the rack and fitted to rotate only in a bracket 49 projecting rearwardly from the standard 37 of the rack-support.

The rack is guided and held in engagement with the gear wheel 29 by a U-shaped adjustable support 35, having horizontal arms extending over the base of the work-carriage 12, these arms being slotted to allow the necessary movement of the support. The bolts 36 screw into the base of the carriage 12 through the slots in the arms of the support 35 and are released to allow the support to be adjusted for gear wheels of different diameters, and when screwed down secure the support in place.

In order to determine the adjustment of the work relative to a previous position, I provide indexing holes 44 in the plate 14, and corresponding holes 45 adapted to register with them in one of the arms 19. An indexing key 47 passes through the two holes 44 and 45, that are in register, and holds the index arm 19 and the plate 14 in fixed relation. All of the indexing holes 44 in the plate 14, except the one occupied by the indexing key 47 and the other objective holes, are filled with plugs 46 (shown in detail in Fig. 8). The holes 44 are slightly countersunk and the heads of the plugs are enlarged to fit therein flush with the top of the plate 14, and are of sufficient length to extend slightly beneath the bottom of the plate so that they may be easily removed by pressing them up from beneath the table. The indexing holes 44 are so arranged and numbered that the correct position of the work relative to a former position is easily determined therefrom. For example, suppose that it is desired to cut six rosettes on a cylinder, as is shown in Figs. 5, 6 and 7. After the first one is cut, the periphery must be turned just 60° from its former position. First the plugs 46 are removed from the objective holes 44 and then the clamping bolts 20 are loosened and the indexing key 47 removed and the worm turned. The worm wheel 16, the indexing arm 19, the carrier 22, the spindle 21 and the work are rotated by the worm, but since the clamping bolts 20 are released, the plate 14 and the gear wheel 29 do not rotate, and the carriage 12 is not moved. When the indexing arm is carried around just 60°, that is, until a hole 44 is reached from which the plug was removed, the key 47 is again inserted, the clamping bolts 20 are again locked, and the work is ready for the next operation. This provides a simple and absolutely reliable means of indexing.

In adjusting the work, for example after one or more rosettes have been cut or partly cut and the work has been removed and is reinserted, if the position in which the work has been clamped does not afford a register of a hole of the indexing arm 19 with a hole 44 of the plate 14, a very delicate adjustment can be obtained by means of the adjusting screw 48 at the rear end of the rack. The set-screws 50 are unscrewed, thus releasing the rack in the standard 37, and the rack is adjusted by the screw 48, thereby rotating the gear wheel 29 and hence the plate 14 until the indexing holes register and the key 47 can be inserted.

The supporting base 34 of my device is shown as secured to the table of the milling machine by bolts 51 having square heads fitting in the T-slot 52. Adjustment to and from the cutting tool is made by a feed screw 54, and vertical adjustment by a feed screw 55.

Some results of the operation of the machine are shown in Figs. 5, 6 and 7, and Figs. 9, 10 and 11. These are male and female rollers which may be used for rolling or fluting circular rosettes in hair cloth and other material. It is evident that a large variety of designs may be produced on metal, stone or wood.

As shown, each cylinder to be operated on is provided with a key-way, which fits over a corresponding key in the spindle 21 and thus holds the work securely to its place. If necessary, spacing blocks may be put above and below the work, as shown, to assist in clamping it in place. A tool 31, having a single cutting tooth, such as is shown in Fig. 1, may be used and in the ordinary manner shifted for each groove.

In the operation of cutting such a figure as one of the rosettes shown in Figs. 5 to 7 or 9 to 11, the work is advanced toward the cutting tool for the proper depth of cut by the feed screw 54, and is rolled before the cutting tool by the actuation of the worm 17. After the first rosette is completed, the work is turned on its axis the proper number of degrees, as above described, with reference to the indexing plate, and the cutting operation repeated. This is continued until the article is completed.

It is obvious that various modifications may be made in the constructions shown and above particularly described within the principle and scope of my invention.

I claim:

1. A machine for cutting figures on cylindrical work comprising, in combination with a revolving cutting tool, means for actuating the same to delineate the desired figure in a plane, and means for imparting both a rotary movement and a substantially equal rectilinear movement to the work, whereby a cylindrical surface of the work is presented at all times substantially in the plane of the cutting tool in operative relation thereto.

2. A machine for cutting curvilinear figures on cylindrical work comprising, in combination with a cutting tool revolving on a stationary axis, means for imparting both a rotary movement and a substantially equal rectilinear movement to the work, whereby a cylindrical surface of the work is presented at all times substantially in the plane of the cutting tool in operative relation thereto.

3. A machine for cutting figures on cylindrical work comprising, in combination with a cutting tool, means for imparting a rotary movement to the work in operative relation to the tool, and means for compounding the rotary movement with a bodily linear movement of the work, whereby a cylindrical surface of the work is presented at all times substantially in the plane of the cutting tool in operative relation thereto.

4. A machine for cutting curvilinear figures on cylindrical work comprising, in combination with a cutting tool revolving on a stationary axis, means for imparting a rotary movement to the work in operative relation to the tool, and means for bodily moving the work a corresponding distance along a plane substantially in the plane of rotation of the tool.

5. A machine for cutting figures on cylindrical work comprising, in combination with a cutting tool revolving on a stationary axis, a worm and worm wheel for imparting a rotary movement to the work in operative relation to the tool, and means for bodily moving the work a corresponding distance along a plane substantially in the plane of rotation of the tool.

6. A machine for cutting figures on cylindrical work comprising, in combination with a cutting tool revolving on a stationary axis, a worm and worm wheel for rotating the cylindrical work in operative relation to the tool, a rack, and a gear wheel meshing therewith and concentric with the work, the gear wheel being rotated with the work and adapted by its coöperation with the rack to bodily move the work a corresponding distance.

7. A machine for cutting figures on cylindrical work comprising, in combination with a cutting tool revolving on a stationary axis, a worm and worm wheel for rotating the cylindrical work in operative relation to the tool, a gear wheel concentric with the work and rotated therewith, a rack adapted to mesh with the gear wheel and adjustable to and from the axis of the gear wheel to accommodate gears of different diameters, the gear wheel being adapted by its coöperation with the rack to bodily move the work a corresponding distance.

8. A machine for cutting figures on cylindrical work comprising, in combination with a cutting tool revolving on a stationary axis, an indexing plate for the work, a worm and worm wheel for rotating the work, means for adjusting the work relatively to the indexing plate, and means for bodily moving the work a corresponding distance along a plane substantially in the plane of rotation of the tool.

9. A machine for cutting figures on cylindrical work comprising, in combination with a cutting tool revolving on a stationary axis, a worm and worm wheel for rotating the work, an indexing plate for the work, a gear wheel concentric with the work and rotated with the indexing plate, means for adjusting the work relative to the indexing plate, and a rack adapted to coöperate with the gear wheel and adjustable to and from the axis of the gear wheel to accommodate gear wheels of different diameters, the gear wheel being adapted by its coöperation with the rack to move the axis of the work a corresponding distance along a plane substantially in the plane of rotation of the tool.

10. A machine for cutting figures on cylindrical work comprising, in combination with a cutting tool revolving on a stationary axis, a worm and worm wheel for rotating the work, an indexing plate for the work, a gear wheel concentric with the work and rotated with the indexing plate, means for adjusting the work relative to the indexing plate, a rack adapted to coöperate with the gear wheel, and means on the rack for adjusting the indexing plate relatively to the work, the gear wheel being adapted by its coöperation with the rack to move the work a corresponding distance along a plane substantially in the plane of rotation of the tool.

11. A machine for cutting figures on cylindrical work comprising, in combination with a cutting tool revolving on a stationary axis, a worm and worm wheel for rotating the work, an indexing plate for the work, a gear wheel concentric with the work and rotated with the indexing plate, means for adjusting the work relative to the indexing plate, a rack adapted to coöperate with the gear wheel and adjustable to and from the axis of the gear wheel to accommodate gear wheels of different diameters, and means on the rack for adjusting the indexing plate relatively to the work, the gear wheel being adapted by its coöperation with the rack to move the work table a corresponding distance along a plane substantially in the plane of rotation of the tool.

12. A machine for cutting figures on cylindrical work comprising, in combination with a cutting tool revolving on a stationary axis, a worm and worm wheel for rotating the work, an indexing plate for the work, means for adjusting the work relative to the indexing plate, an indexing arm moved with the work, indexing holes in the indexing plate, and means for moving the work a corresponding distance along a plane substantially in the plane of rotation of the tool.

13. In a machine for cutting figures on cylindrical work, an indexing plate having indexing holes therein, an indexing arm coöperating therewith, and removable plugs in the indexing holes of the table.

14. A machine for cutting figures on cylindrical work comprising, in combination with a cutting tool revolving on a stationary axis, a worm and worm wheel for rotating the work, a rack with pitch plane substantially parallel with the plane of rotation of the cutting tool, a gear wheel rotated with the work and adapted to coöperate with the rack and roll the work before the cutting tool, and means for rotatively adjusting the work relative to the gear wheel comprising a plate having indexing holes therein, removable plugs in the holes, and an indexing arm moved with the work.

15. A machine for cutting figures on cylindrical work comprising, in combination with a cutting tool revolving on a stationary axis, a longitudinally-adjustable stationary rack extending substantially parallel to the plane of rotation of the cutting tool, an indexing plate having indexing holes therein, removable plugs in the holes, means for rotating the work, an indexing arm coacting with the indexing plate, a gear wheel rotated with the indexing plate and adapted to coöperate with the rack and roll the work before the cutting tool, and means for adjusting the rack and thereby adjusting the indexing plate relative to the indexing arm.

In testimony whereof I have affixed my signature in presence of two witnesses.

CHARLES WIEBKE.

Witnesses:
BERNARD COWEN,
VICTOR D. BORST.